June 15, 1926.    1,588,752
F. LANG
VALVE
Filed Oct. 31, 1925    2 Sheets-Sheet 2

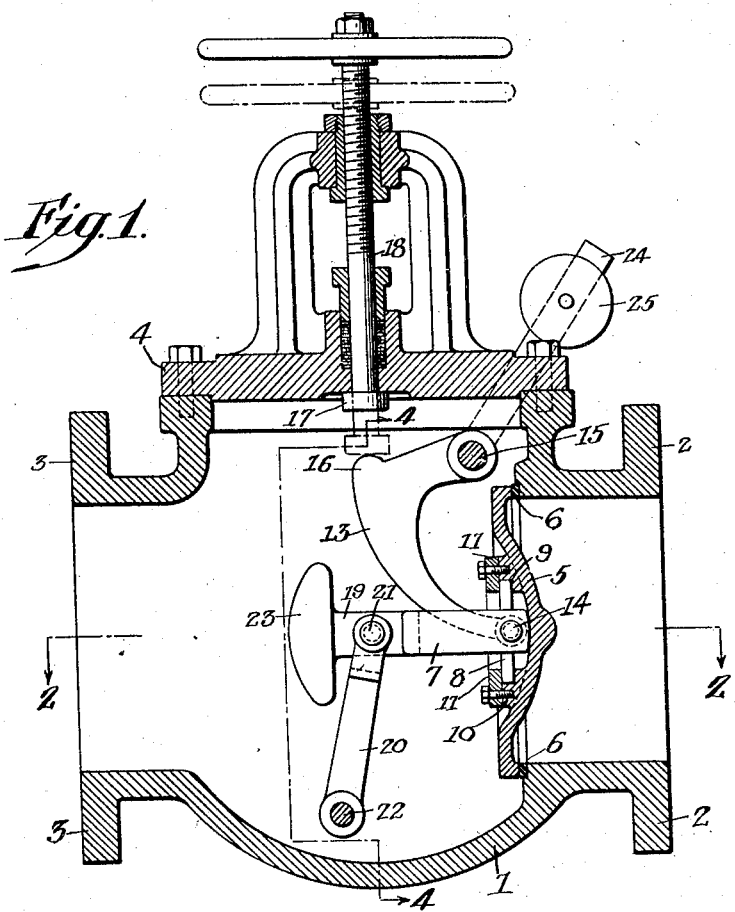
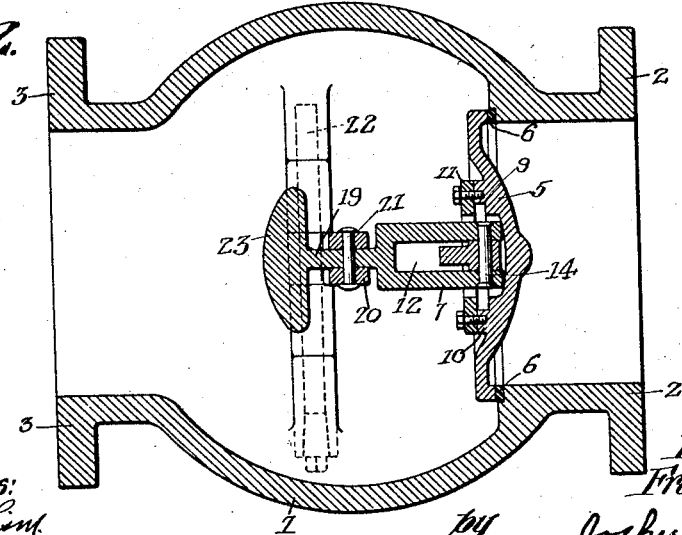

Witnesses
Walter Chiam
Evelyn Crompton

Inventor
Frank Lang
by
Joshua R. H. Potts
his Attorney

Patented June 15, 1926.

1,588,752

UNITED STATES PATENT OFFICE.

FRANK LANG, OF PHILADELPHIA, PENNSYLVANIA.

VALVE.

Application filed October 31, 1925. Serial No. 65,956.

My invention relates to valves and more especially to balanced check valves designed for use in pipe lines where valves very sensitive to pressure are required such, for instance, as pipe connections leading from steam turbines to superheaters.

It is essential that such valves should be sensitive to very slight differences in pressure, and it is highly desirable that all parts of the valve be readily accessible without removal from the pipe connection; that the flow of steam from the turbine to the superheater be unobstructed except by the valve, and that the friction be reduced to the minimum, and the object of my invention is to provide a valve of simple construction which will meet these requirements more perfectly than the valves heretofore used.

Figure 3:
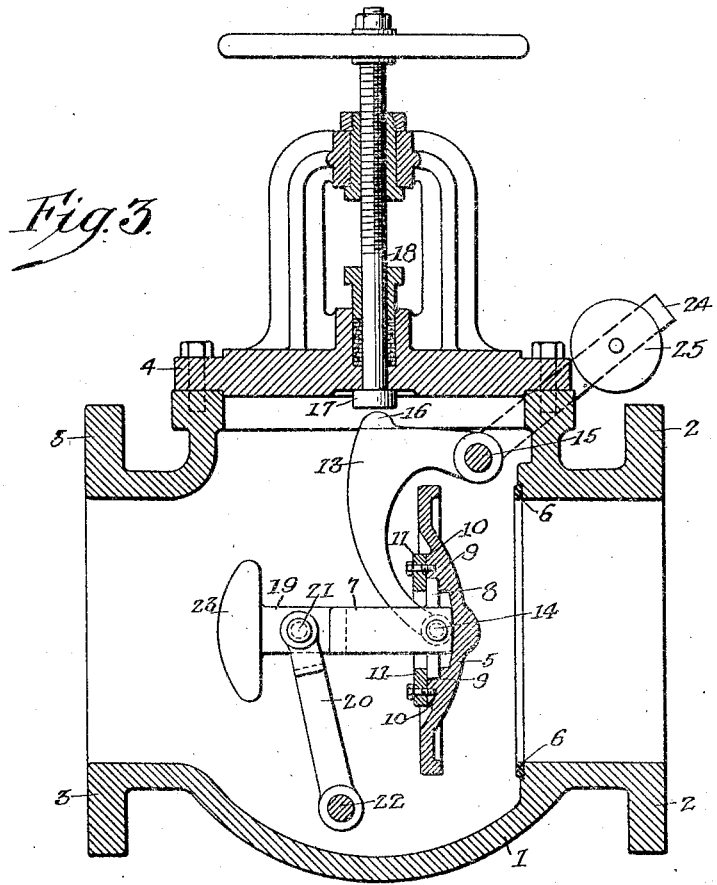
Figure 4:
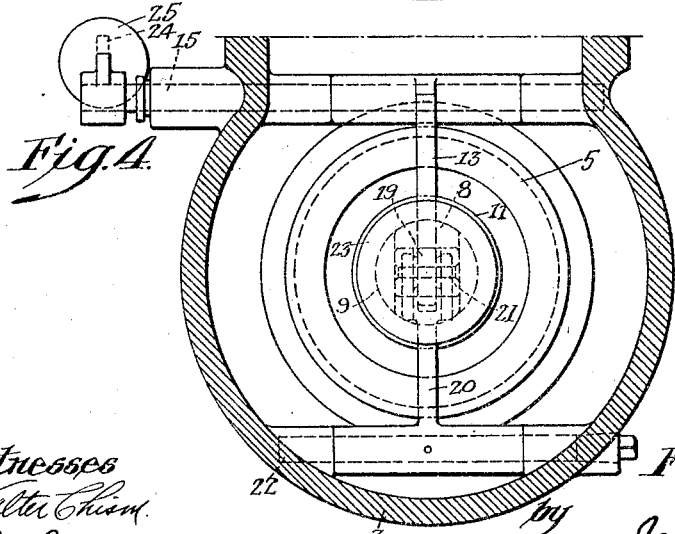

This object, and other advantageous ends which will be described hereinafter, I attain in the following manner, reference being had to the accompanying drawings in which Figure 1 is a section through a valve and valve housing embodying my invention and showing the valve closed, some of the parts being shown in elevation, Figure 2 is a section on line 2—2 of Figure 1, Figure 3 a view similar to that shown in Figure 1 but showing the valve open, and Figure 4 a section on line 4—4 of Figure 1.

Referring to the drawings, 1 indicates the valve chamber which communicates with the turbine through a union 2 and with the superheater through a union 3. It is closed at the top by a removable plate 4 which carries the usual mechanism for closing the valve when it is desired to shut off communication between the turbine and the superheater, 5 indicates the valve disk and 6 the valve seat. A stem 7 is detachably and pivotally connected to the valve by a collar 8 having two plane sides, seated in an angular recess 9 in an annular lug 10 extending from the rear of the valve disk and held in place by an annular plate 11 bolted to the lug. The stem at the end next the valve disk has a recess 12 within which one end of an angular link 13 is pivotally mounted on a pin 14, the other end of the link being fixed to a rod 15, pivotally supported in the valve housing and having one end extending through the housing. Link 13 has a heel or boss 16 adapted to be engaged by an enlargement 17 on the inner end of a threaded rod 18 for positive closing of the valve, but normally out of engagement therewith. The other end of the stem is reduced at 19 and one end of a link 20 is pivotally connected to the reduced part by a pin 21. The other end is fixed to a rod 22 pivotally mounted in bearings on the housing. The free end of stem 7 carries a weight 23 adapted to counterbalance or practically counterbalance the weight supported by link 13, the weight of the parts being so proportioned that the weight carried by the pivot pins 14 and 21 shall be as nearly equal as is possible. Inasmuch as it is difficult to obtain absolute uniformity of weight in metal parts, an arm 24 is fixed to the end of rod 15 which extends through the housing and a slidable weight 25 is mounted upon the arm. By adjusting this weight to positions nearer to or further from rod 15, the weight sustained by link 13 may be counterbalanced to any desired degree and a perfect balance of the valve parts obtained.

When it is desired to positively close the valve, which may be effected by screwing rod 18 downward against boss 16 on link 13 the pressure is exerted in a line practically co-incident with the axis of rod 18 and the closure is made with a minimum of friction.

By the construction above described all of the working parts are housed in the valve chamber and are readily accessible, the valve seat may be readily reground without removal of any part except the cap and the valve is perfectly balanced whether partly open or wide open.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A check valve including a valve disk; a stem connected with the rear of the valve disk; a link pivotally connected with the stem adjacent the valve disk, and a link pivotally connected with the rear of the stem.

2. A check valve including a valve disk; a stem connected at one end with the rear of the valve disk and weighted at its opposite end to counterbalance the valve; a link pivotally connected with the stem adjacent the valve disk, and a link pivotally connected with the stem intermediate its ends.

3. A check valve including a valve disk; a stem connected with the rear of the valve disk; an angular link pivotally connected with the stem adjacent the valve disk, and a link pivotally connected with the rear of the stem.

4. A check valve including a valve disk; a stem; a connection between the valve disk and the stem whereby the disk may rotate relatively to the stem; a link pivotally connected with the stem adjacent the disk, and a link pivotally connected with the rear of the stem.

5. A check valve including a valve disk; a stem; a collar on the stem; a bearing for the collar in the rear of the disk; means for holding the collar in its bearing; a link pivotally connected with the stem adjacent the disk, and a link pivotally connected with the rear of the stem.

6. A check valve including a valve disk; a stem connected to the disk; an angular link pivotally connected with the front of and adapted to support the stem; a link pivotally connected with and adapted to support the rear of the stem, and means on the rear end of the stem for counterbalancing the weight of the disk.

7. A check valve including a valve disk; a stem connected to the disk; a link pivotally connected with the front of the stem and adapted to support the disk; a link pivotally connected with and adapted to support the rear of the stem, and a counterweight adjustably connected with the disk-supporting link.

8. A check valve including a valve disk; a stem connected to the disk; a link pivotally connected with the front of the stem and adapted to support the disk; a link pivotally connected with and adapted to support the rear of the stem; means on the stem for counter-balancing the weight of the disk, and a counterweight adjustably connected with the disk-supporting link.

9. A check valve including a valve disk; a stem detachably connected with the rear of the valve disk; a link pivotally connected with the stem adjacent the valve disk, and a link pivotally connected with the rear of the stem.

In testimony whereof I have signed my name to this specification.

FRANK LANG.